United States Patent [19]

Matsumoto et al.

[11] Patent Number: 4,610,483
[45] Date of Patent: Sep. 9, 1986

[54] VEHICLE BRAKE SYSTEM

[75] Inventors: Yukio Matsumoto; Toshio Takayama, both of Kanagawa, Japan

[73] Assignee: Tokico Ltd., Kanagawa, Japan

[21] Appl. No.: 736,121

[22] Filed: May 20, 1985

[30] Foreign Application Priority Data

May 18, 1984 [JP] Japan ................ 59-100308

[51] Int. Cl.$^4$ ................ B60T 8/74
[52] U.S. Cl. ................ 303/97; 303/100;
303/114; 60/545; 91/519; 92/49; 180/282
[58] Field of Search ............. 303/93, 97, 20, 100,
303/105, 113, 114, 106, 119; 188/181 A, 181 R,
181 C, 357; 60/545; 91/519; 92/49; 180/282

[56] References Cited

U.S. PATENT DOCUMENTS

| 2,978,080 | 4/1961 | Beatty ................ | 188/357 |
| 3,630,579 | 12/1971 | Rodi ................ | 188/105 |
| 4,057,301 | 11/1977 | Foster ................ | 303/114 |
| 4,494,445 | 1/1985 | Furuta et al. ................ | 92/49 |

FOREIGN PATENT DOCUMENTS

| 21666 | 11/1961 | Japan . | |
| 0188746 | 11/1983 | Japan ................ | 303/114 |

Primary Examiner—Bruce H. Stoner, Jr.
Assistant Examiner—Alvin Oberley
Attorney, Agent, or Firm—Wenderoth, Lind & Ponack

[57] ABSTRACT

In a vehicle brake system including a pneumatic force multiplier apparatus in which a power piston moves by virtue of a pressure difference between atmospheric and negative pressure, a manual brake switch is provided to apply braking force without need for depressing the brake pedal. A controller includes a deceleration calculating circuit reading vehicle speed for every specified number of seconds and calculating the amount of deceleration. The deceleration is compared with a predetermined value and braking force is increased, maintained, or decreased depending on whether the vehicle is running on a downwardly sloping, level, or unwardly sloping road.

1 Claim, 2 Drawing Figures

VEHICLE BRAKE SYSTEM

BACKGROUND OF THE INVENTION

The present invention relates to a vehicle brake system which produces braking force automatically under predetermined conditions.

When the driver of a vehicle wishes to stop on a sloping road, or when the driver must stop the vehicle frequently on a congested road, it is desirable that braking force is produced while the brake pedal is not being depressed.

A vehicle brake system which produces braking force automatically under specific conditions is already known. In a well known power multiplier in which a shell body displaceably receives through a diaphragm a power piston which faces negative pressure applied to a front side constant pressure chamber and atmospheric air pressure applied to a rear side operation pressure chamber, the pressure difference produces thrust to the power piston which transmits the thrust to the output shaft. A manual brake switch is connected to a change over valve which is connected with the operation pressure chamber. By operation of the manual brake switch, the position of the change-over switch is controlled such that atmospheric air is introduced in the operation pressure chamber to automatically produce braking force. When vehicle speed decreases to a predetermined value, braking force is decreased.

When such known vehicle brake system operates on a downward slope, braking force is automatically produced. However, the braking force produced for a flat road is not sufficient for a downward slope, so that a vehicle which has slowed down may accelerate once more when braking force is decreased at a low speed.

The object of the present invention is to provide a vehicle brake system in which substantially similar deceleration is applied to the vehicle by automatically varying braking force on upward and downward slopes.

SUMMARY OF THE INVENTION

Briefly described, to attain the above-mentioned object, the vehicle brake system including a pneumatic force multiplier apparatus according to the present invention comprises a vehicle speed sensor, an acceleration switch, a manual brake switch, change-over valve means cooperating with the input member and directly introducing atmospheric air into one of the control chambers defined in the power piston, the other control chamber communicating with the front chamber in the shell body which is connected with a negative pressure source, and a controller comprising a deceleration calculating circuit, a timer, a comparator circuit and a command signal producing circuit.

Under specific operating conditions, e.g. when the accelerator is not depressed, if the manual brake switch is ON, atmospheric air is introduced into the operating pressure chamber of the shell body, vehicle speed is read every T seconds, deceleration is calculated, and the amount of deceleration is compared with a predetermined value. When the deceleration is less than a predetermined value, braking force is increased, and when the deceleration is more than another predetermined value, braking force is decreased. When the degree of deceleration is between the two predetermined values, braking force is maintained.

As the vehicle speed is read every T seconds, and as braking force is automatically controlled by the amount of deceleration, braking force is decreased on an upward slope, as compared with running on a level road, and further, braking force is increased on a downward slope. Thus, generally similar deceleration can be obtained so that the vehicle can be stopped while maintaining confortability.

DETAILED DESCRIPTION OF THE EMBODIMENT

Figure 1:
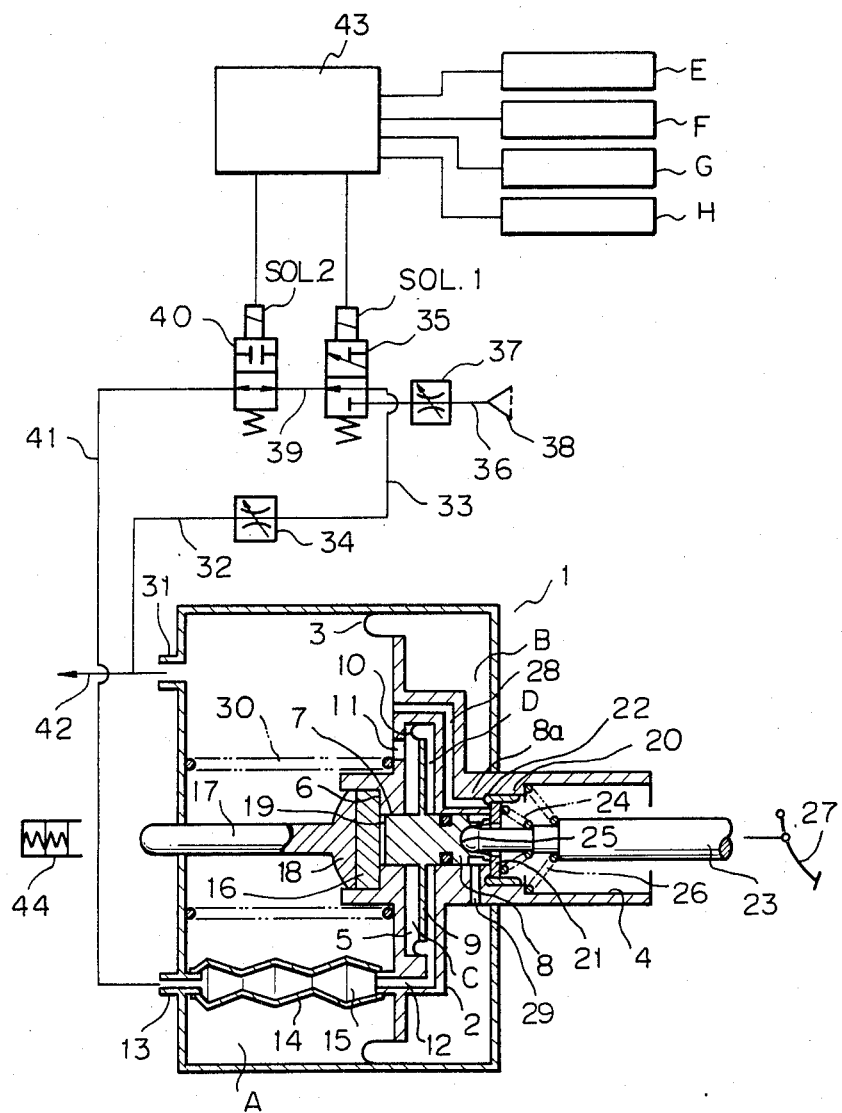
FIG. 1 is a schematic sectional view of a vehicle brake system with pneumatic and electric circuits according to the present invention.

Referring now to FIG. 1, reference numeral 1 designates a single booster type shell body for a vehicle brake system. The shell body 1 encloses a power piston 2 which defines within the space in the shell body 1 a first constant pressure chamber or a front chamber A and a first operating pressure chamber or a rear chamber B.

The power piston 2 includes a diaphragm 3, and is displaceably mounted in the shell body 1 through the diaphragm 3. The rear side or right side portion in FIG. 1 of the power piston 2 hermetically projects from the shell body 1 and is slidably supported by the shell body 1. A stepped opening 4 is formed in a central portion of the power piston 2. In the power piston 2, a control chamber 5 extends radially from the inner periphery of the stepped opening to the outer periphery of the power piston 2. A recess 6 is formed on the front side or left side in FIG. 1 of the power piston 2.

A control piston 7 is received in the control chamber 5. The control piston 7 comprises a shaft portion 8 slidably engaged in the small diameter portion of the stepped opening 4, a partition wall 9 extending in a flange shape from the outer periphery of the shaft portion 8, and a diaphragm 10 which is mounted on the inner periphery of the control chamber 5 formed on the outer periphery of the partition wall 9. At the rear end of the shaft portion 8, a valve seat 8a is formed. The control chamber is divided by the control piston 7 into a second constant pressure chamber C and a second operation pressure chamber D. On the front side of the power piston 2, a communication hole 11 is formed to communicate the first constant pressure chamber A with the second constant pressure chamber C.

On the front side, or left side in FIG. 1, of the power piston 2, a projection having a passage 12 is formed. The second operation pressure chamber D is formed in the power piston 2 and is communicated with the passage 12. The passage 12 is connected with a connection port 13 through an extensible conduit 14 which is isolated in the first constant pressure chamber A. The port 13 opens on the front side of the shell body 1. Thus, the connection port 13 is communicated with the second operation pressure chamber D through the passage 15 in the conduit 14 and the passage 12. In the recess 6 is provided a reaction disc 16 made of an elastomer material such as rubber and a flange 18 formed at the rear end of an output shaft 17.

Between the reaction disc 16 and the shaft portion 8, a clearance 19 is formed. The intermediate diameter portion of the stepped opening 4 displaceably receives a poppet valve 21 through a soft sealing member 20. The poppet valve 21 engageably opposes a valve seat 22 which is formed in the power piston 2, and is urged by a spring 24 which is engaged between a stepped portion of an input shaft 23 and the poppet valve 21. The input shaft 23 is positioned in the central portion of the power piston 2 and fits in the stepped opening 4. The free end of the power piston 2 engages with a recess 25 formed at the rear end of the shaft portion 8. A spring 26 urges the input shaft 23 rearwardly. A brake pedal 27 is connected to the rear end of the input shaft 23. A passage 28 is formed in the power piston 2 and communicates with the first constant pressure chamber A at one end and with the rear end of the small diameter portion of the stepped opening 4. The opening of the passage 28 near the poppet valve 21 is opened and closed by the displacement of the poppet valve 21. A passage 29 is formed in the power piston 2 and communicates with the first operating pressure chamber B at one end and with the small diameter portion of the stepped opening at the other end. A return spring 30 between the front wall of the shell body 1 and the front end of the power piston 2 urges the power piston 2 rearwardly. A connection port 31 on the front wall of the shell body 1 communicates with the first constant pressure chamber A.

The connection port 31 is connected with a change-over valve 35 through conduits 32 and 33 and a flow control valve 34. To the change-over valve 35, a filter 38 and a flow control valve 37 are connected through a conduit 36 for introducing atmospheric air into the change-over valve 35. The change-over valve 35 is connected with a change-over valve 40 through a conduit 39. The change-over valve 40 is connected with the connection port 13 through a conduit 42. The connection port 31 is connected with a negative pressure source, not shown, through a conduit 42. A controller 43 is electrically connected with the change-over valves 35 and 40.

The controller 43 comprises a micro computer having a deceleration computer circuit, a comparator circuit and an indication transmitting circuit. A vehicle speed sensor, acceleration switch, manual brake switch and hand brake switch, not shown, are mounted at predetermined portions of the vehicle brake system. Vehicle speed sensor signal E, acceleration switch signal F, manual brake switch signal G and hand brake switch signal H are applied to the controller 43. When the signals satisfy predetermined conditions, the controller 43 controls the change-over valves 35 and 40.

Operation of the above-mentioned vehicle brake system will now be described. In normal operation, when the brake padal 27 is depressed to apply forward thrust force to the input shaft 23, the control piston 7 is displaced forwardly, leftward in FIG. 1, to separate the valve seat 8a from the poppet valve 21. Atmospheric air in the stepped opening 4 outside the poppet valve 21 flows into the space between the poppet valve 21 and the valve seat 8a and through the passage 29 to the first operation pressure chamber B. As negative pressure is applied in the first constant pressure chamber A through the connection port 31, the pressure difference between the first constant pressure chamber A and the first operation pressure chamber B is applied to the power piston 2, so that the power piston 2 moves forward in a power multiplification operation.

The forward thrust of the power piston 2 is transmitted directly to the output shaft 17. Also the thrust of the input shaft 23 is transmitted to the control piston 7, and the shaft portion 8 of the control piston 7 contacts and urges the reaction disc 16 which transmits the thrust to the output shaft 17. The rearward reaction is transmitted from the output shaft 17 to the reaction disc 16 so that the reaction disc 16 is elastically deformed such as to make contact with the shaft portion 8. Thus the reaction is transmitted to the brake pedal through the shaft portion 8 and the input shaft 23. In normal operation, the change-over valves 35 and 45 are positioned as shown in FIG. 1, so that negative pressure is applied to the second constant pressure chamber C and the second operation pressure chamber D. Thus, the control piston 7 has no effect on the above-mentioned operation of the power piston 2.

When the depression of the brake pedal 27 is released, the control piston 7 moves rearwardly by reaction force of the output shaft 17 so that the valve seat 22 is separated from the poppet valve 21. Thus, the first operation pressure chamber B communicates with the first constant pressure chamber A through the passage 28 to eliminate the pressure difference between the chambers A and B. The power piston 2 is returned to its original position by the return spring 30.

When the operator wishes to temporarily stop the vehicle on a sloping road surface, it is desirable to produce braking force automatically. In this case, operation of the manual brake switch actuates the brake system to stop the vehicle.

When the operator stops the vehicle while running on a road, the operation of the normal brake system makes the necessary braking power smaller on an upward slope and larger on a downward slope as compared with a level road. Thus, the braking force which is suitable for a level road is too great for an upward slope and is too small for a downward slope.

Figure 2:
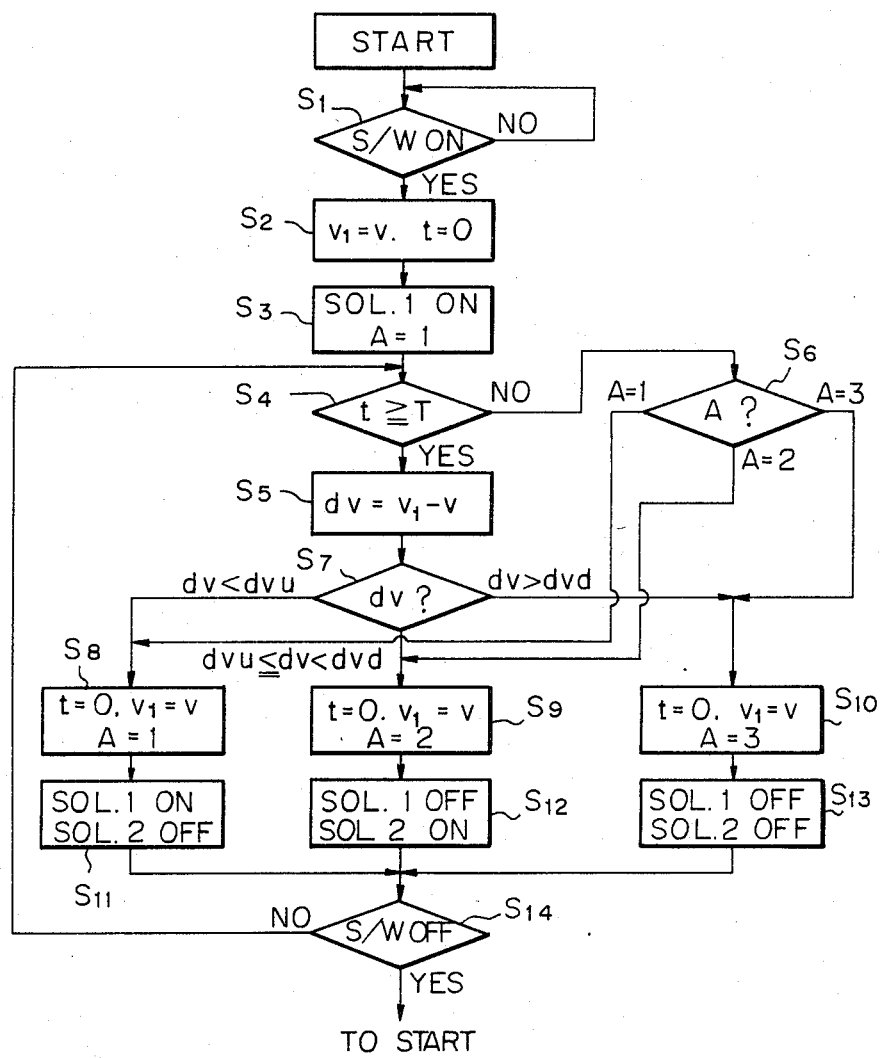
FIG. 2 is a flow chart for control of the brake system shown in FIG. 1.

According to the present invention, under predetermined conditions, e.g. when the acceleration pedal is not being depressed, if the manual brake switch is ON, the vehicle speed is detected every T seconds and deceleration is calculated. When the amount of deceleration is more than a predetermined value, e.g. on an upward slope, the applied braking force is decreased. When the amount of deceleration is less than a predetermined value, e.g. on a downward slope, the braking force is increased. When the deceleration is within a certain limit, e.g. on a level road, the braking force is maintained. The operation will be described further by referring to a flow chart shown in FIG. 2.

From the inoperative position of the brake system, shown in FIG. 1, the manual brake switch is put ON at step S1. Step S2 is to apply vehicle speed v to $v_1$, and time t is reset to zero. The time "t" is actuated by a clock. At step S3, solenoid SOL1 of the change-over valve 35 is actuated and A=1. Atmospheric air flows from the filter 38 through the flow control valve 37, change-over valves 35 and 40, connection port 13 and the passages 15 and 12 into the second operation pressure chamber D.

As the first constant pressure chamber A communicates with the second constant pressure chamber C to apply negative pressure, the pressure difference between the second constant pressure chamber C and the second operation pressure chamber D is applied to the control piston 7 which moves leftwards. Thus, a clearance is produced between the valve seat 8a and the poppet valve 21. Air flows from the right side of the poppet valve 21 into the clearance and flows through the passage 29 to the first operation pressure chamber B.

Consequently, a pressure difference is produced between the first constant pressure chamber A and the first operation pressure chamber B and urges the power piston 2 leftwards to produce hydraulic pressure at the master cylinder 44. The braking force produced decelerates the vehicle.

At step S4, judgement is made as to whether or not "t" has reached to predetermined set time T. When t=T, the process advances to step S5, and when t>T, it advances to step S6. At step S5, the vehicle speed v is read, and the amount of deceleration $v_1 - v$ is calculated and applied to dv. At step S7, the dv is compared to establish whether it is smaller than a predetermined speed dvu, larger than another predetermined speed dvd, or between the two. When dv<dvu, which means the vehicle is on a downward slope, the program goes to step S8. When dvu≦dv≦dvd which means that the vehicle is on a level road, the program goes to step S9, and when dv>dvd which means it is on an upward slope, the program goes to step S10. At step S8, time t is reset to zero, speed $v_1 = v$, and A=1. At step S11, solenoid SOL1 of the change-over valve 35 is ON, and solenoid SOL2 of the valve 40 is OFF. Similarly to step S3, the control piston 7 is urged by the pressure difference to add braking force to the power piston 2.

At step S9, time t is reset to zero, speed $v_1 = v$, and A=2. At step S12, solenoid SOL1 of the change-over valve 35 is OFF and solenoid SOL2 of the change-over valve 40 is ON. The second operation pressure chamber D is cut off from atmospheric pressure and negative pressure so that normal braking force is maintained.

When dv>dvd, i.e. is on an upward slope, the program goes to step S10 in which time t is reset to zero, $v_1 = v$, and A=3. At step S13, solenoid SOL1 of the change-over valve 35 is OFF and also solenoid SOL2 of the change-over valve is OFF, as shown in FIG. 1. The second operation pressure chamber communicates with the negative pressure source, so that no effect is applied to the braking force of the power piston by the control piston 7 whereby braking force is reduced.

Now the steps S11, S12 and S13 proceed to step S4. When the manual brake switch is not OFF, the program goes to step S4 in which, when time t reaches the predetermined time T, speed v is read, and at step S5 $dv = v_1 - v$ is calculated and the above-mentioned control is repeated.

At step S6, judgement is made as to whether A=1, A=2 or A=3. When A=1, the program goes to step S8 and then to step S11, as described before, after time t reaches T. From step S11 the program returns to step S4. When A=2 at step S6, the program goes to step S8 and then to step S12 and returns to step S4 as described before. When A=3 at step S6, the program goes to step S9 and then to step S12 and returns to step S4 as described before.

The operation is repeated until the manual switch OFF signal is applied to the controller 43. As shown in step S14 in FIG. 2, when the switch OFF signal is applied, the program returns to the start position.

As described in detail, the vehicle brake system according to the present invention includes a brake force automatic control system such that when a manual brake switch is ON, vehicle speed is read every T seconds, and the amount of deceleration $dv = v_{n-1} - v_n$ is calculated. When the amount of deceleration dv is less than a predetermined value dvu, brake force is increased, and when the deceleration dv is more than another predetermined value dvd, brake force is decreased. When the deceleration dv is between dvu and dvd the brake force is maintained. On a sloping road, the gravity effect of vehicle weight affects the braking distance. According to the present invention brake force is decreased on an upward slope, and is increased on a downward slope automatically, so that the vehicle is stopped by substantially similar deceleration whatever the slope of the road.

What is claimed is:

1. A vehicle brake system including a force multiplier apparatus which includes a shell body, a power piston displaceably mounted in the shell body through a diaphragm, a control chamber defined in the power piston, a partition wall means displaceably mounted in the control chamber to define two control chambers, said power piston defining within the shell body a front chamber and a rear chamber, and a valve mechanism in said power piston which cooperates with an input member to control pressure between said chambers, whereby when a pressure difference is produced in said front and rear chambers by operating the input member, a thrust is produced in the power piston which is transmitted to an output shaft, and the reaction force produced in the output shaft is transmitted to the input member, said system further comprising a controller operatively connected to a vehicle speed sensor, an acceleration switch, a manual brake switch and, change-over valve means, said change-over valve means cooperating with said input member to increase, maintain, and decrease force by controlling introduction of atmospheric air or negative pressure into one of the control chambers defined in said power piston, the other control chamber communicating with said front chamber in said shell body which is connected with said negative pressure, said controller controlling said change-over valve means under specified conditions, said controller comprising a deceleration calculating circuit for calculating the amount of deceleration of the vehicle, a timer which is actuated when said manual brake switch is ON and which determines the operation timing of said deceleration calculation circuit, a comparator circuit for comparing the output of said deceleration calculating circuit with predetermined values so as to judge the operating condition of the vehicle, and a command signal transmitting circuit for producing brake force increase, maintain and decrease signals corresponding to the vehicle operating conditions judged by the comparator circuit.

* * * * *